June 9, 1936.　　　　A. GALANTE　　　　2,043,322
AUTOMATICAL GRADUAL CLUTCH
Filed June 12, 1934
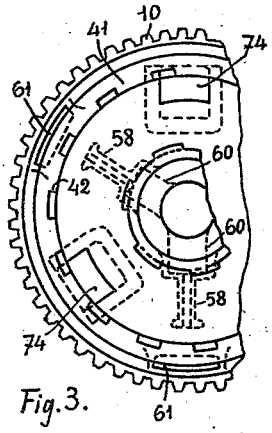
Fig.3.
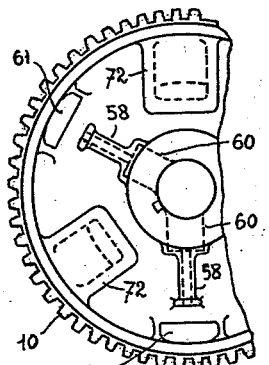
Fig.4.
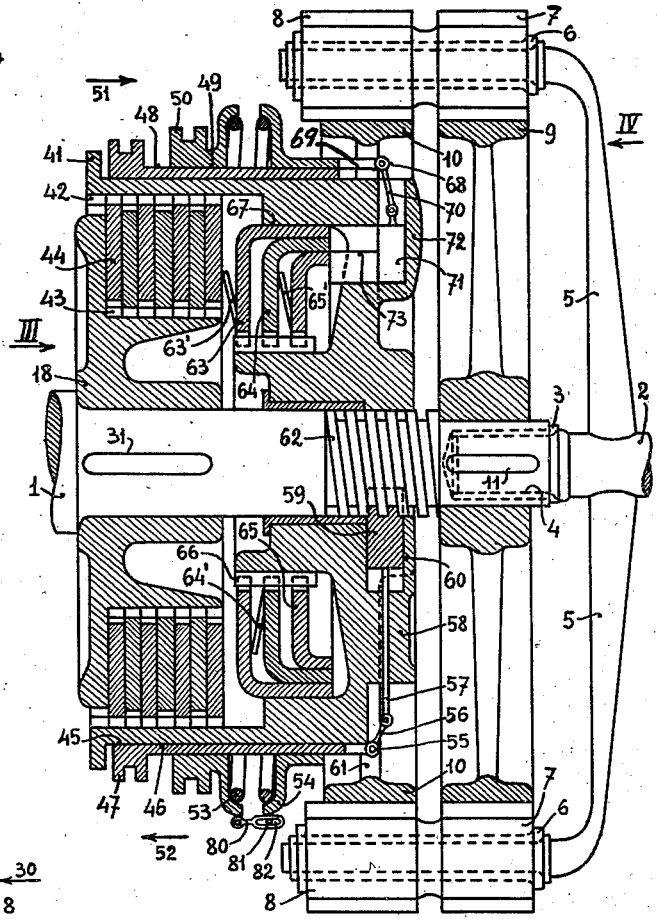
Fig.2.
Fig.1.
Inventor:
A. Galante
By: Marks & Clerk
Attorneys.

Patented June 9, 1936

2,043,322

UNITED STATES PATENT OFFICE 2,043,322

AUTOMATICAL GRADUAL CLUTCH

Aldo Galante, Genoa, Italy

Application June 12, 1934, Serial No. 730,345
In Italy July 8, 1933

5 Claims. (Cl. 74—260)

The present invention has for its object a device by means of which the gradual clutch between the driven and driving shafts is automatically realized.

The automatic friction coupling according to the present invention is characterized by the use of a friction coupling set into action by the relative motion of two wheels, each of which forms part of an individual epicycloidal gearing, the train carrying arm of one of the gearings being connected (coinciding) with the train carrying arm of the other gearing and one of the wheels of the first epicycloidal gearing being connected to the wheels of the other epicycloidal gearing. Thus, for instance, the pinions of one of the epicycloidal gearings may be connected to those of the other epicycloidal gearing, or the last wheel of one of the epicycloidal gearings may be connected to the last wheel of the other epicycloidal gearing.

The practical realization of the automatic clutch according to the present invention, as previously indicated, may be carried out in various forms: the wheels may be either conical or cylindrical, the drive of the brake may be entirely or partially automatic, etc.

In one of the constructional implements according to the present invention, the device is also characterized by the presence of centrifugal masses set into rotation by a wheel of one of the aforesaid epicycloidal gearings, and by the fact that one of the parts of the friction clutch is connected to the driven shaft, whereas the other part of the friction clutch is connected to the driving shaft, these two parts of the friction clutch permitting of being compressed together—so as to obtain a friction moment—by the said centrifugal masses the rotation speed of which around the axis is, except for a short instant at the beginning of the operation, proportional to the angular speed of the driven shaft.

Another characteristic of the device in accordance with the invention lies in the fact that the individual transmission ratios of the various pairs of toothed wheels are so selected that the train carrying arm common to the two epicycloidal gearings is submitted to a braking action which varies automatically so that the closer the working of the device is to the conditions of direct transmission of the motion from the driving shaft to the driven one, the stronger this action is, said braking action having as a result the dragging of the train carrying arm by the driven shaft.

According to another practical embodiment, the automatic friction coupling is obtained by using epicycloidal gearings provided with spur gear wheels, the relative motion of the two parts destined to press together the friction surfaces of the clutch being produced by a nut and screw coupling, these two parts being respectively connected to and operated by the driven shaft and connected to the last wheel of the epicycloidal gearing and operated by hand (or vice versa).

This second embodiment will show further constructional features, as hereinafter described and claimed.

The accompanying drawing illustrates, by way of example only, these two practical embodiments; in particular, Fig. 1 shows in axial section the first embodiment of the object of the present invention, and Figs. 2 to 4 the second embodiment.

Fig. 2 is a view in similar section to that of Fig. 1, Fig. 3 is a part view of one of the wheels in the direction of the arrow III, and Fig. 4 is a part view of the same wheel but in an opposite direction to that of Fig. 3 (arrow IV).

Referring to the drawing, (1) is the driven shaft which, towards the driving shaft (2), terminates with a recess accommodating a bearing (3) inside which rests the extension (4) of the driving shaft (2), this arrangement permits the correct alignment of these two shafts.

Upon the bearer or carrying arm (5) of the shaft (2) the two bevel gears (7) and (8) constituting a single member are mounted by means of the bearing (6); the former gear meshes with the wheel (9) and the latter with the wheel (10); the wheel (9) is keyed on the shaft (1) by means of the key (11) whereas the wheel (10) is rotatably mounted on this shaft by means of the bearing (12).

By indicating with VII, VIII, IX and X the numbers of the teeth of the four wheels (7, 8, 9, 10), it follows that these numbers are so selected as to realize the following relation:

$$\frac{IX.VIII}{VII.X} \text{ less than one}$$

which can be obtained, for instance, by arranging the ratio $$\frac{VII}{IX}$$

greater than the ratio $$\frac{VIII}{X}.$$

The wheels (7, 9, 10) may have, for instance the same number of teeth (for instance 40), whereas the wheel (8) will have this number less one (in this case 39). The hub of the wheel (10) extends by teeth or projections (13) adapted to mesh with corresponding notches (14) on a hub (15) provided with a friction disc (16); the corresponding second friction disc (17) is fastened to the shaft (1) by means of the boss (18) and, the key (31). A ball bearing (19) receives the thrust of a spring (20) tending to space the discs (16 and 17) in the directions of the arrows (21) and therefore to open the clutch, set up by these discs (16) and (17). The boss of the wheel (10) is also formed with a cylindrical surface (22) whereupon moves a slider (23) which, by means of a connection (24), engages with the end of a ball lever (25) pivotally mounted at (26) upon ears carried by the boss of the wheel (10); the ball lever (25) mounted at (26) carries, at the end of its second arm (28), a mass destined to work by centrifugal force.

The working of the device is the following:

When the engine is still, the spring (20) spaces the two discs (16) and (17) in the direction of the arrows (21) while the sleeve (23) is pushed to the right (of the figure) by means of a lever (32) pivoted at (33), so that the masses (29) are held inoperative in their closest position to the axis of rotation. When the engine revolves and sets the shaft (2) into rotation, the train carrying arm (5) starts rotating and the wheel (7) follows the motion of the train carrying arm (5) thus rolling on the wheel (9) which is connected, by means of the key (11), to the shaft (1) which is still stationary, whereas the wheel (8)—which follows the rotation of the wheel (7)—compels the wheel (10) to revolve slowly in the direction of the shaft (2). This rotation of the wheel (10) is transmitted to the disc (16) by means of the teeth (13) and the notches (14) constituting substantially a toothed clutch; by means of the ears (27) and the pins (26) this rotation is also transmitted (with the interposition of the levers 25—28), to the masses (29) which are thus caused to start rotating. If the sleeve (23) is now shifted towards the left thus permitting the said masses to exert their centrifugal force, this gives the disc (16) a thrust in the direction of the arrow (30) through the levers (28, 25), and then this disc (16), by reacting against the spring (20), is caused to press against the disc (17) thus setting up a friction moment tending to draw the shaft (1) in the same direction of rotation as that of the shaft (2). When the centrifugal masses (29) are permitted to exert their centrifugal action, the action increases (through the kinematic sequence just indicated) in the direction of the arrow (30) until the friction moment between the discs (16 and 17) reaches such a value as to start the rotation of the shaft (1). The moment wherein such condition occurs, depends upon the numbers of teeth adopted for the wheels, the dimensions of the arms of the levers (25—28), the dimensions and number of the masses (29), conformation, number and disposition of the friction surfaces of the clutch which, in the figure, is represented provided simply with the friction discs (16 and 17). The disc (17) and the shaft (1) then begin being drawn in rotation so that also the wheel (9) starts the rotation and the revolution speed of the wheel (7) on its pin (5) for the purpose of rolling on the wheel (9) decreases accordingly. The wheel (8) which, being connected to the wheel (7), will turn equally more slowly around its pin (5), will cause the wheel (10) to have a lesser angular speed so that it will revolve with a slower speed than before relatively to the wheel (9) and consequently to the shaft (1). However, the absolute angular speed of the whole, and therefore of the wheel (10) and the masses (29) is increased, so that the centrifugal force developed by such masses and the pressure action exerted by the disc (16) against the disc (17) in the direction of the arrow (30) are increased. The phenomenon now indicated continues until, in relation to the selection effected for the number of the teeth and in relation to the dimensions of the levers, the numbers and dimensions of the masses, of the friction surfaces, etc. the locking of the discs (16) and (17) is secured; then, the whole assembly revolves as a sole unit and the motion is rigidly transmitted from the shaft (2) to the shaft (1).

Should it be required to open such clutch, it is necessary to push, by means of the lever (32), the slider (23) in an opposite direction to that of the arrow (30) and then the masses (29) in centripetal direction by means of the pull rod (24); then, the spring (20), by spacing apart the discs (16, 17) in the direction of the arrows (21), disconnects totally the shaft (1) from the shaft (2).

In the form illustrated in Fig. 2, in which the same reference numbers of Fig. 1 have been adopted as far as possible, the wheel (10) is connected direct to the cylindrical body (41) provided with the inner ribs (42) which, co-operating with the body (18) formed with the outer ribs (43) and provided with the discs (44) (meshing with the ribs (42) and the ribs (43) in alternate relation), constitutes the friction coupling. On the exterior cylindrical surface (45) of the body (41) and adapted to slide in the direction of the arrows (51, 52), is mounted the sleeve (46) formed with the groove (47) by means of which it can be caused to move in axial direction by actuation of the connection and disconnection lever (not shown); on the cylindrical outer surface (48) of the body (46) is mounted the sleeve (49) formed with the groove (50) by means of which, it also may be displaced, independently of the sleeve (46), in axial direction by actuation of the speed lever (not shown).

The sleeves 49 and 54 are slidably mounted on the cylindrical surface 48, the spring 53 being interposed between said sleeves. A pull rod 80 is connected to one of the elements 49 or 54 and is formed with a slot into which projects a pin 51 on the other of these two elements. The sleeve or disc 54 is thus, while subject to the action of the spring 53, nevertheless capable of being drawn in the direction of the arrow 52 by the sleeve 49.

The sleeve (46), at its end towards the wheel (10), is provided with projections terminating with eyelets (55) (see the bottom part of Fig. 2) passing through the disc of the wheel (10) through apertures (61) and on which small rods (56) are applied; the other end of each of which is connected to and operates the rods (57) guided within the guides (58) radially arranged on the disc of the wheel (10); at the end of the rods (57) directed towards the axis of rotation there are provided parallelopipedon blocks (59) threaded on their side facing shaft (1); the blocks (59) are guided in their approaching and withdrawing motions to and from the shaft (1) by radial guides (60) carried by the disc of the wheel (10); these blocks, seen in number of three and located at 120° from each other are destined, when the sleeve (46) is pushed in the direction of the arrow (51), to engage with the threading (62) of the shaft (1) and to push, when there exists relative motion between the shaft (1) and the wheel (10), this latter wheel (10) in the direction of the arrow (52), i. e. in the direction corresponding to the closing of the clutch (41—44). The closure of the clutch (41—44) takes place through a group of spring elements the number of which corresponds to that of the speeds desired for the device operated by the engine; in the case of Fig. 2, these speeds and therefore these elements are assumed to be three; the three elastic elements (63, 64, 65) are so constituted and arranged as to realize the two following conditions: (a) the maximum thrust exerted by them is always the same whether this thrust is exerted only by one of them or by two or by all; (b) the travel that must be covered by the wheel (10) and the cylindrical body (41) of the clutch connected thereto, varies from a minimum to a maximum value depending upon the operation conditions of the device.

The three spring elements (63, 64, 65) are bell shaped and slidable axially within each other and all within the inner cylindrical surface (67) of the body (41) while being drawn in rotation by the wheel (10) by means of their notches meshing with the ribs (66) of the wheel boss (10); the lengths of the cylindrical portions of the three elements are gradually decreasing and from their flat bottoms normal to the axis of rotation protrude small elastic tongues (63', 64', 65') (the tongues of an element being staggered with those of the adjacent elements), the tongue (65') being in contact with the bottom of the element (64), the tongue (64') with the bottom of the element (63) and the tongue (63') with the first of the elements (44) of the coupling. When the clutch is open, the rims of the cylindrical portions of the elements (63, 64, 65) lie all on the same plane normal to the axis of rotation (Fig. 2). The body (54) presents, at the end towards the wheel (10), projections terminating with eyelets (68), passing through the disc of the wheel (10) by openings (69), to which projections are connected the actuating rods (70) having their other end connected to the sliding members (71) that such rods control in their approaching and withdrawing motions to and from the axis of the shaft (1), the said sliding members, being for this purpose, guided in radial guides (72) carried by the disc of the wheel (10). (The aforesaid elements are present in the number of three and are arranged at 120° from each other and staggered relatively to the (57) to (61) mentioned above); the sliders (71) are provided with projections (73) passing through the disc of the wheel (10) by openings (74) and directed towards the cylindrical periphery of the bodies (63, 64, 65), the dimensions of the said projections (73) being such that they will be opposed to the cylindrical rim of the elastic element (65) alone when the sliding members (71) are pushed towards the shaft (1), opposed to the rims of the two elastic elements (65) and (64) simultaneously when these members are midway of their travel, and opposed to all the rims of the three bodies (65, 64, 63) aforesaid when such sliding members are displaced to the maximum extent towards the exterior.

From the foregoing it follows that when the sleeves (49) and (54) are completely pushed in the direction of the arrow (51), that is to say, the sliders (71) are at the end of their travel towards the shaft (1) and the projections (73) press on the rim of the elastic element (65) only, the motion of the wheel (10) in the direction of (52) acts on the discs (44) through all of the three elastic elements (63, 64, 65), and therefore, to reach the maximum deformation (and therefore the maximum reaction of the elastic tongues 65', 64', 63'), it is necessary to effect a travel equal to the sum of the elastic deflections of such elastic elements whereas, if, through a partial motion of said sleeves (49) and (54) a partial running of the sliders (71) is obtained, their projections (73) press against the rims of the elements (65 and 64) simultaneously, and the transmission of the thrust on the discs (44) takes place only through the elastic tongues (64' and 63'), thus realizing the same reaction as that of before, but with a travel of the wheel (10) equal to ⅔ of the preceding one. Finally, if the sleeves (49) and (54) are displaced to the utmost according to (52), then the projections (73) of the 20 elements (71) act upon the edges of all of the three cylindrical bodies (65, 64, 63) simultaneously, and the thrust to the discs (44) is transmitted with the sole interposition of the elastic tongues (63') with a strain still equal to the previous ones, but with a running of the wheel (10) equal to ⅓ of that initially considered.

The device indicated above also utilizes, during the speed changes, the centrifugal force applied to the sliding members (71) inasmuch as, by compressing the spring (53), it tends to displace the sliding members (71) towards the exterior, i. e. to make the closure of the clutch (41—44) more rapid, as necessary, when there is the passage from a speed ratio to another.

The operation of the device of Fig. 2 is substantially equal to that of Fig. 1. In addition, there is to consider the operation of the elastic elements (63—64—65).

To effect the starting from rest with engine running the procedure to follow is this:—

When it is desired to put in the drive direct (in the exemplified case, when it is desired to put in the third speed direct), it is obviously necessary to have a period of maximum starting; to realize this feature, the sleeve (59—54) will be entirely displaced in the direction of the arrow (51) so that the blocks (71) may be in their position nearest the axis (1), that is to say in such a position as to react on their element (65) and therefore on all of the three groups of elastic elements (65', 64', 63') which are in this manner in series. It is obvious that in this case, in order to obtain the closing pressure for the clutch (41—44), the maximum displacement in axial direction is necessary for the wheel (10); which is carried out by pushing through the sleeve (46) the threaded blocks (59) against the threaded portion (62) of the shaft (1).

Further, in the case where it is desired to start with the second speed, always with the engine running and the car firm, the sliders (71) are displaced so that their projections (73) come to press upon the two elastic elements (65) and (64); it will then occur that, to obtain the closing pressure for the clutch (41—44) (with the same strength as that obtained before) the wheel (10) must effect in axial direction a travel inferior to that effected in the case previously considered, and more exactly equal to two thirds of this.

Finally, in the case where it is desired to effect, always with the engine running, the starting of the first speed, the sliders (71) will be displaced to the exterior so that they act on all of the three elements (65—64—63), so that, in order to obtain the pressure necessary for the closing of the clutch (41—44) (pressure equal to that of the two preceding cases), it will be necessary that the wheel (10) should effect a minimum axial displacement, i. e. a displacement equal to ⅓ of the first displacement considered, and to ½ of the second displacement considered.

The various positions aforesaid that must be assumed by the blocks (71) with their connections in correspondence to the various speeds turned in, will be made synchronous with the different positions that for each of them shall be assumed by the speed lever; the means whereby such correspondence of the speed lever with the members (71) or members connected thereto is obtained, will consist of a device whatever provided with pull rods, or the like, not shown in the figure as not considered in the present invention.

Should it be necessary to change speed when the axis (1) rotates with the same number of revolutions as the shaft (2), the threaded blocks (59) will be withdrawn from the threaded portion (62) of the shaft (1) by means of the clutch lever; then by effect of the elastic elements (63', 64', 65') the wheel (10) will move in the direction of the arrow (51), while the sliders (71) are simultaneously pushed, owing to the centrifugal force whereto they are submitted, to the exterior which will cause a compression of the spring (53), so that; for a new advancing of the wheel (10), the projections (73) of the elements (71) will press against the elastic elements (65 and 64) simultaneously or, when it is question of great angular speeds, straightway on all of the three elements (65, 64, 63).

The method of operation hereinbefore described depends either upon the value of the centrifugal force or on the speed selected.

To take into account the axial motions of the wheel (10) the teeth of the pinion (8) are longer than those of the wheel (10) (or vice versa). The numbers of the teeth of the wheels (7, 8, 9 and 10) are also suitable, for the operation of Fig. 2, for the conditions previously determined to obtain the same operation as that indicated in connection with Fig. 1.

Although for descriptive reasons the present invention has been based upon the foregoing specification and the accompanying drawing, yet many practical modifications may be made in the realization of the invention itself; thus for instance, it is possible to vary the number of the teeth of the wheels maintaining same however always such as to suit the fundamental conditions previously indicated; to connect the disc (17) to the shaft (1) through a free spring device (joint operating in a sole direction), and to adopt simultaneously means adapted to put out of action such spring by locking it at will; to modify the type of friction coupling; to cause the driven shaft to operate as driving shaft and vice versa, etc. these and other modifications being however based on the conceptions of the present invention as set forth in the following claims.

Having now particularly described and ascertained the nature of the present invention and in what manner the same is to be performed, what is claimed is:—

1. A friction clutch and means for coupling and uncoupling said clutch, comprising two epicycloidal gearings, one operatively connected to the driven shaft and the other operatively connected to a clutch member and having a centrifugally-operated means in said last-named connection, said gearings including pinions and wheels, a common train-carrying arm for said gearings the pinion of one of said gearings being rigidly connected to the other of said gearing and the number of teeth of the wheels and pinions being such that the product of the number of teeth in the wheel operatively connected to the driven shaft by the number of teeth in the pinion driving the wheel operatively connected to a clutch member is less than the product of the numbers of the teeth in the remaining pinion and wheel.

2. The device as claimed in claim 1 in which the centrifugally operated means includes masses, the angular speed of the driven shaft being, except at starting, proportional to the rotational speed of said centrifugal masses around their axes.

3. The device as claimed in claim 1 in which means are included for moving the wheel of the gearing connected to the clutch member longitudinally of the driven shaft, said means including a block radially slidable in said last named wheel and having screw threads on its inner face and screw threads on the driving shaft for engaging the same.

4. The device as claimed in claim 1 which includes concentric nested cup-shaped members mounted to rotate with but slide longitudinally on the hub of the wheel connected to the clutch member, springs between said cup-shaped members and between one of said members on the clutch and the centrifugally operated means consist of a block abutting an increasing number of said cup-shaped members as it moves outwardly from the axis.

5. The device as claimed in claim 1 in which the centrifugally operated means includes masses, the rotational speed of which around the axis is proportional to the difference in the angular velocity between the gear operatively connected to the driven shaft and the gear operatively connected to the clutch member.

ALDO GALANTE.